United States Patent
Cassano et al.

(10) Patent No.: US 8,818,558 B2
(45) Date of Patent: Aug. 26, 2014

(54) METHOD FOR CONTROLLING AT LEAST TWO ROBOTS HAVING RESPECTIVE WORKING SPACES INCLUDING AT LEAST ONE REGION IN COMMON

(75) Inventors: Rosario Cassano, Grugliasco (IT); Bruno Cicciarello, Grugliasco (IT); Elena Grassi, Grugliasco (IT); Luca Lachello, Grugliasco (IT); Enrico Mauletti, Grugliasco (IT); Fabrizio Romanelli, Grugliasco (IT)

(73) Assignee: Comau S.p.A., Grugliasco (Torino) (IT)

( * ) Notice: Subject to any disclaimer, the term of this patent is extended or adjusted under 35 U.S.C. 154(b) by 100 days.

(21) Appl. No.: 13/473,124

(22) Filed: May 16, 2012

(65) Prior Publication Data
US 2013/0110288 A1    May 2, 2013

(30) Foreign Application Priority Data

Oct. 31, 2011   (IT) .................................. TO11A0994

(51) Int. Cl.
*G05B 19/04*    (2006.01)
*G05B 19/18*    (2006.01)
*B25J 9/16*     (2006.01)

(52) U.S. Cl.
CPC .............. *B25J 9/1666* (2013.01); *B25J 9/1676* (2013.01)
USPC ............................ 700/255; 700/248; 700/253

(58) Field of Classification Search
CPC ............ B25J 19/06; B25J 9/16; B25J 9/1666; B25J 9/1676; G05B 19/04; G05B 19/18; G05B 19/418
USPC ............ 700/245–264; 701/23, 28; 318/568.1, 318/568.11, 568.12, 568.16, 575, 567, 566, 318/560; 414/744.2, 735, 680
See application file for complete search history.

(56) References Cited

U.S. PATENT DOCUMENTS

| 5,561,742 A | 10/1996 | Terada et al. | |
|---|---|---|---|
| 5,798,627 A | 8/1998 | Gilliland et al. | |
| 6,212,444 B1 * | 4/2001 | Kato et al. | 700/255 |
| 6,330,495 B1 * | 12/2001 | Kaneko et al. | 700/264 |
| 7,321,808 B2 * | 1/2008 | Nagamatsu | 700/248 |
| 2005/0273200 A1 * | 12/2005 | Hietmann et al. | 700/248 |
| 2007/0118250 A1 | 5/2007 | Nagamatsu | |
| 2007/0150093 A1 * | 6/2007 | Nagatsuka et al. | 700/235 |
| 2012/0215351 A1 * | 8/2012 | McGee et al. | 700/248 |

FOREIGN PATENT DOCUMENTS

| JP | 59205601 | 11/1984 |
|---|---|---|
| JP | 04019084 | 1/1992 |

* cited by examiner

*Primary Examiner* — Khoi Tran
*Assistant Examiner* — Rachid Bendidi
(74) *Attorney, Agent, or Firm* — Young Basile Hanlon & MacFarlane P.C.

(57) ABSTRACT

Methods for controlling at least two robots having respective working spaces, including at least one region in common are disclosed. The working space of each robot is modelled by defining one or more interference regions each constituted by an elementary geometrical figure. The interference regions are classified as: prohibited interference regions, defined as regions of space where the presence of the robot must without fail always be inhibited; monitored interference regions, defined as regions of space where the presence of the robot is accepted, but controlled, the robot being pre-arranged for sending a signal to the central control unit whenever it enters a monitored region and whenever it exits from a monitored region; and hybrid interference regions that are able to change between a status of monitored region and a status of prohibited region as a function of an input signal to the robot sent by said central control unit.

3 Claims, 6 Drawing Sheets

METHOD FOR CONTROLLING AT LEAST TWO ROBOTS HAVING RESPECTIVE WORKING SPACES INCLUDING AT LEAST ONE REGION IN COMMON

FIELD OF INVENTION

The embodiments herein are directed in general to a method for controlling at least two robots having respective working spaces including at least one region in common, pre-arranged in which is a central electronic unit for control of the robots, provided for communicating with the various robots and for governing the movements of the robots preventing an interference between the robots in their common working region.

BACKGROUND

In standard programming of an industrial cell with a number of robots that are to work in a shared space, it is necessary to define instructions within the program of each robot in order for the robot to carry out in succession the following operations:
1. Request for booking for entry into the shared region (an output signal to the control unit)
2. Wait for consent from the control unit for entry into the shared region (an input signal to the robot from the control unit)
3. Presence within the shared region (an output signal)
4. Exit from the shared region The succession of these commands must be repeated on each individual part of program in which a so-called programming "interblock" is envisaged (corresponding to a working step in the shared region). Management of the policy that regulates the accesses to one or more shared regions is entrusted to the control unit (PLC), which assumes the task of governing the priority of the robots that can gain access to said regions. In a simple example of program in which only two robots share a common working area, the PLC, given a request for access from a robot R1, checks that there are no other pending requests from the robot R2 and that the robot R2 is not working in the shared region. If this is the case, access to the robot R1 is allowed. Likewise, it is possible to reformulate the policy for access of the robot R2. The aforesaid system of PLC accesses can be represented schematically as appears in the annexed FIG. 1.

The robot programs must, on their own part, be able to manage the input signals (for access) and output signals (for communicating to the PLC booking and presence or otherwise within the shared region) in such a way as to be able to manage the policy of access to and exit from the shared regions properly. An example of robot program is the following:

```
send(req_I2, ON)
wait(cons_I2, ON)
send(interf_I2, OFF)
send(req_I2, OFF)
MOVEFLY JOINT TO pnt0650x ADVANCE
MOVEFLY JOINT TO pnt0150x ADVANCE
MOVEFLY JOINT TO pnt0653x ADVANCE
MOVE JOINT TO wp4661,
WITH CONDITION [spot(1, 4661, 1, FALSE)],
ENDMOVE
MOVEFLY JOINT TO pnt0444x ADVANCE
MOVEFLY JOINT TO pnt0443x ADVANCE
MOVEFLY JOINT TO pnt0442x ADVANCE
```

-continued
```
MOVE JOINT TO xtn0008X
Send (interf_I2, ON)
```

As may be seen, there is envisaged sending of the signal req_I2, which represents the request for access to the interblock region I2. Following upon this signal, the system remains waiting for the signal cons_I2 that must be sent by the PLC to enable access to the interblock region. Once the go-ahead has been obtained from the PLC, the robot sends the signal of occupation of the interference region interf_I2 and sends the booking signal req_I2 to zero. Finally, after carrying out the movements, the robot sends the signal of occupation of the interblock region interf_I2 to zero.

Given an architecture of the above sort, the main limits are as follows.

If the flow of the robot programs is modified, there is a high likelihood of setting the system in situations of incongruence; for example, if a robot is moved manually (in PROG) into a shared region, the PLC is not "warned" of its presence, and this may cause a generic malfunctioning of the system of interblocks, with the consequent probable impact between the robots.

The complexity of the robot programs is particularly high in so far as for each single interblock it is necessary to enter the instructions for booking, waiting, presence, and abandonment of the shared region. There is no real-time control of the position of the robot for identifying the presence thereof in a shared region; de-activation of the programs of movement of the robot implies that in programming there does not exist any type of control for preventing collisions between robots. The possible modification of the working programs of the robot necessarily implies a consistent modification of the instructions regarding the interblocks in each part of the program or programs.

A further limit regards the very frequent eventuality that the user might skip some instructions in the working program (a bypass that is prevalently made in the initial steps of programming, for testing the working programs of the robots) or else that the user might move the cursor erroneously within the program, skipping, for example, the operations of request for access or occupation of the interblock region. The object of the present invention is to overcome the aforesaid drawbacks.

SUMMARY

With a view to achieving said object, the embodiments of the invention are methods for controlling at least two robots having respective working spaces including at least one region in common, pre-arranged in which is a central electronic unit for control of the robots, provided for communicating with the various robots and for governing the movements of the robots, preventing any interference between the robots in their common working region. In one method, the working space of each robot is modelled, taking into account the objects present in the working space of the robot, by defining one or more interference regions (IRs), each constituted by an elementary geometrical figure. The aforesaid interference regions are classified in the following three different categories: (1) prohibited interference regions (PIRs), defined as regions of space where the presence of the robot must without fail always be inhibited, for example, on account of the permanent presence of one or more objects with which the robot must not interfere; (2) monitored interference regions (MIRs), defined as regions of space where the presence of the robot is accepted, but controlled, the robot being pre-arranged for sending a signal to the central control unit whenever it enters a monitored region and whenever it exits from a monitored region; and (3) hybrid interference regions (HIRs), defined as regions of space that are able to change between a status of monitored region and a status of prohibited region, as a function of an input signal to the robot sent by said central control unit.

Each robot is pre-arranged for sending to the central control unit a first output signal, serving as entry booking, whenever it is about to enter a hybrid region, and a second output signal, serving as entry/presence warning, whenever it enters a hybrid region; and the status of each hybrid region is varied dynamically for each robot, during operation of the robots, by sending, on the part of the central control unit, of an input signal to the robot, which renders the hybrid region prohibited or monitored for said robot, according to whether said hybrid region is free or otherwise from other robots.

According to a further characteristic, when a hybrid region is switched for a given robot into a status of prohibited region by sending to said robot the aforesaid input signal by the central control unit, if the robot is moving towards said region it is decelerated in a controlled way as far as the limit of the hybrid region, where the speed of the robot reaches zero, whereas, when the region is re-enabled by means of a new input signal to the robot that sends the region into the status of monitored region, the system automatically restores the movement of the robot, without blocking the pending movement of the robot in the case where it is still in progress.

As may be seen, the method according to the invention is basically characterized in that it controls the robots in parallel, instead of adopting the sequential operating mode of the known art. In particular, the method of the invention, in addition to envisaging control of the working space of each robot by means of an output signal from the robot, also envisages the possibility of managing activation/de-activation of inhibition to entry into the hybrid region with an input to the robot from the PLC and moreover envisages the possibility of defining a further output signal to the PLC for booking entry into the hybrid region. The method moreover manages automatic arrest and resumption of the movement of the robot regulating the speed of arrest and resumption thereof in such a way as to prevent sharp stops in the proximity of the limit of the inhibited interference region and to resume movement of the robot as fast as possible.

BRIEF DESCRIPTION OF THE DRAWINGS

The embodiments will be now described, purely by way of non-limiting example, with reference to the annexed drawings, in which.

DETAILED DESCRIPTION OF EMBODIMENTS

Figure 2:
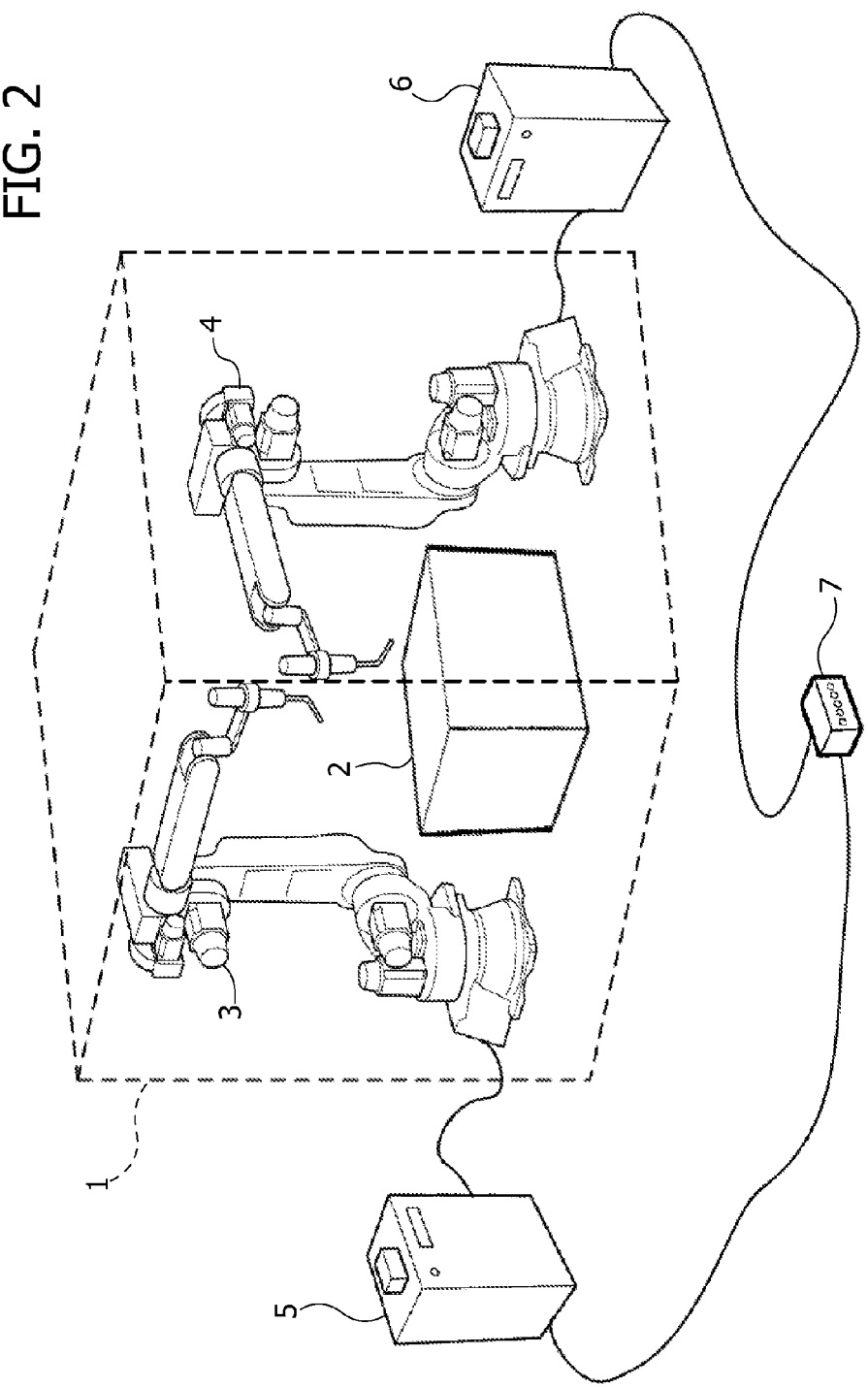
FIG. 2 is a schematic perspective view that shows a cell with two industrial robots having respective working spaces including shared regions.

With reference to FIG. 2, a cell 1 envisages a workstation with a workbench 2 on which two robots 3, 4 carry out operations, for example, for assembly and/or welding of components. The two robots 3, 4 are controlled by respective electronic control units 5 and 6, which are, in turn, both connected to a central electronic control unit 7 used for implementing the method according to the invention. The central unit 7, for example, can be constituted by the PLC for control of the cell 1. However, the function of central control can also be entrusted to one of the two units 5, 6 for control of the individual robots. In addition, in the present description and in the ensuing claims, where reference is made to at least two robots that may interfere with one another also the case of a multi-arm robot, in which at least two arms are controlled separately and might interfere with one another, is included. In this case, the single robot has a single control unit, in which the method of the invention is implemented.

The robots 3, 4 have respective working spaces that include shared regions, which entail a potential risk of interference between the two robots. In the working spaces of the robots objects are also present (for example, the fixed workbench 2) that render altogether inaccessible to the robots the corresponding regions of their working space.

Figure 3:
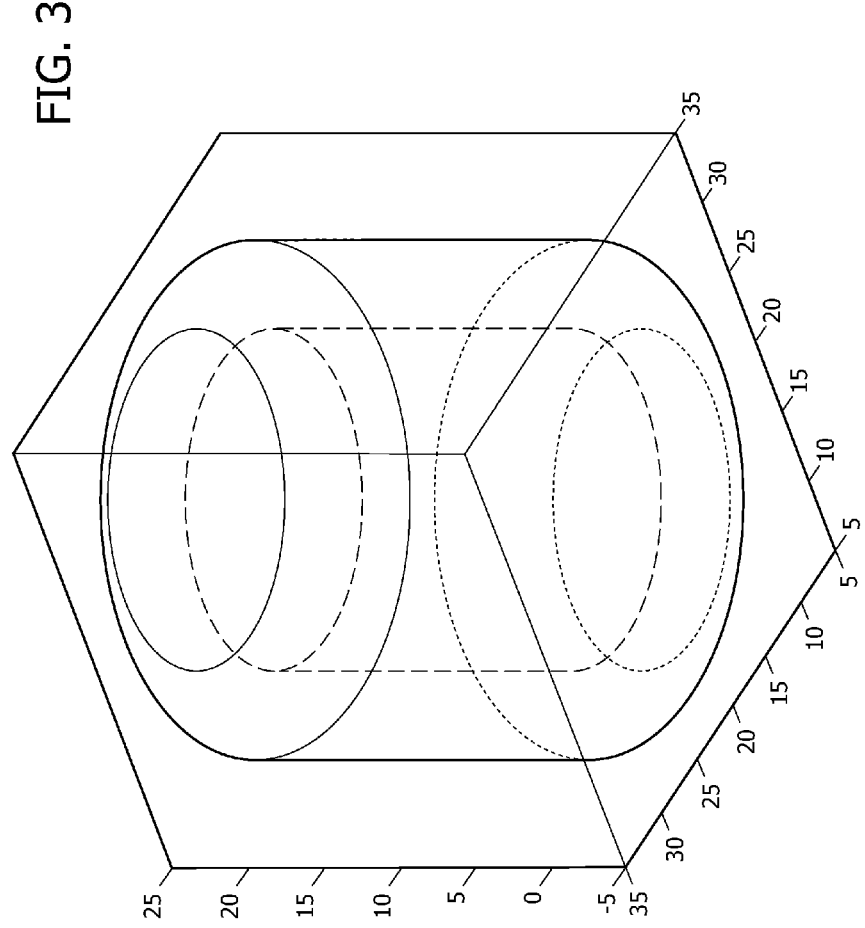
FIG. 3 shows different geometrical figures used for defining the interference regions in the working space of each robot.
Figure 4:
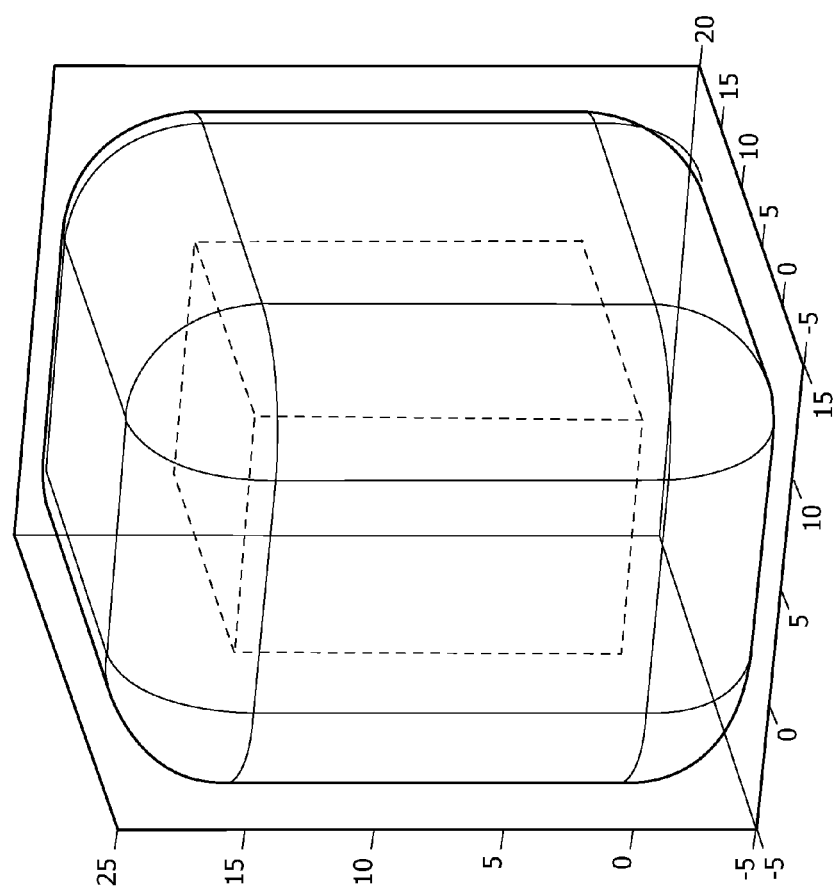
FIG. 4 shows different geometrical figures used for defining the interference regions in the working space of each robot.
Figure 5:
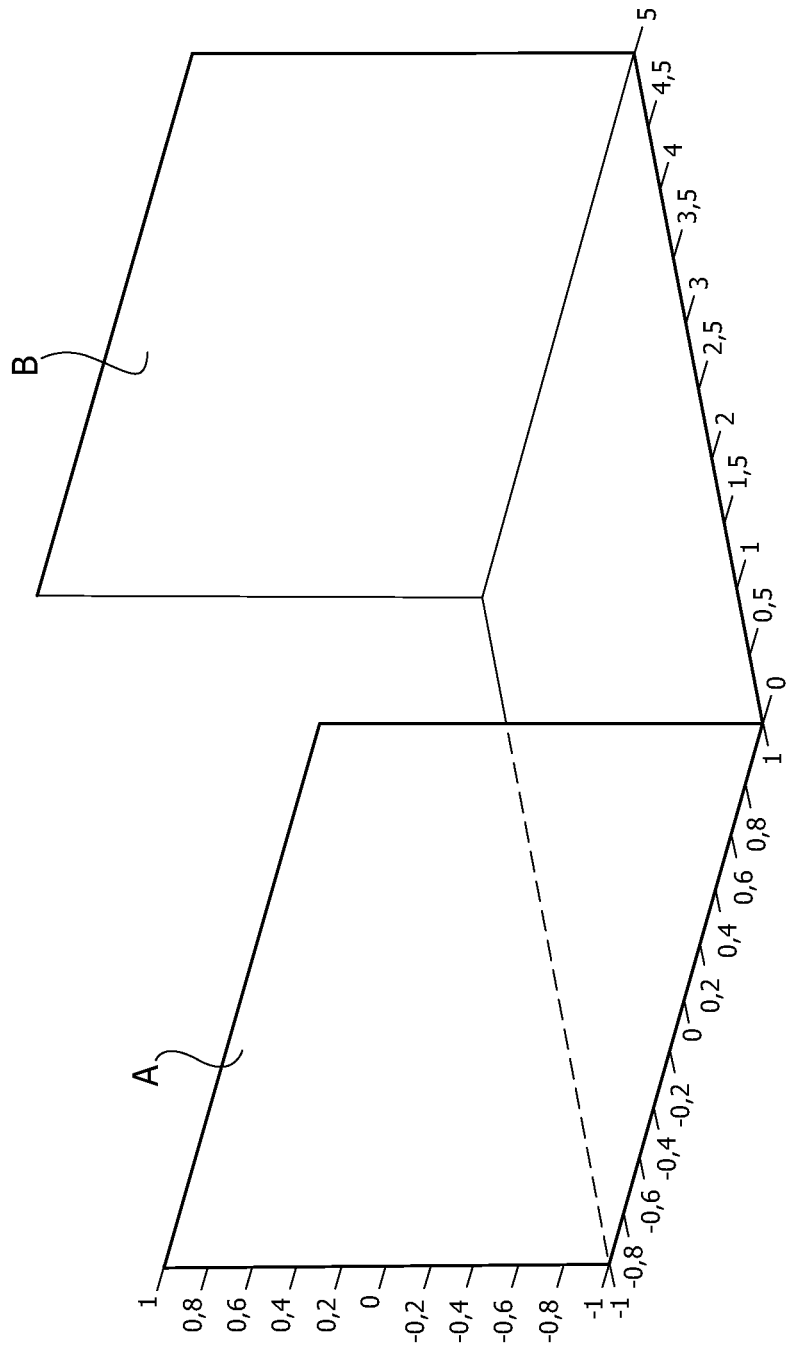
FIG. 5 shows different geometrical figures used for defining the interference regions in the working space of each robot.
Figure 6:
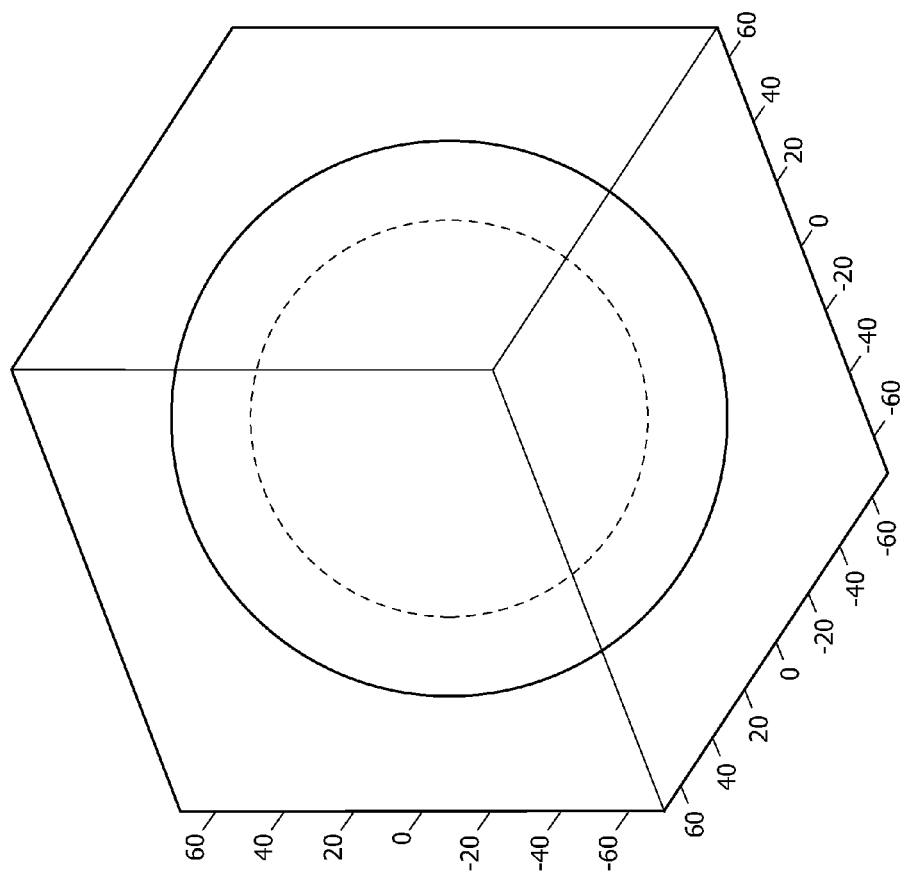
FIG. 6 shows different geometrical figures used for defining the interference regions in the working space of each robot.

To tackle the problem of the interference between each robot and the environment around it, according to the invention elementary geometrical figures are defined, referred to as interference regions (IRs), for example, substantially in the form of cylinders (FIG. 3), parallelepipeds (FIG. 4), planes (FIG. 5), or spheres (FIG. 6), which are to be entered in the working area of the robot in such a way as to have a spatial and volumetric modelling consistent with the objects present within the working space of the robot. In FIGS. 3, 4, and 6, the interference regions are constituted by the volumes represented with dashed lines, contained within larger volumes, represented with solid lines, that function as "warning" regions, within which the approach of a mobile part of the robot to the boundary of an interference region is signalled. In the case of FIG. 5, the interference region is constituted by a vertical plane A. The plane B facing it delimits the boundary beyond which a warning signal is activated.

In the method according to the invention it is possible to define even a high number (for example up to 16) of interference regions. According to the invention, the interference regions are classified in the following three different categories:

Monitored interference regions (MIRs)
Prohibited interference regions (PIRs)
Hybrid interference regions (HIRs)

The monitored regions are volumes where the presence of the robot is controlled, and in the case where the robot accesses these regions, an output signal towards the outside (e.g., towards a PLC) will be raised, and likewise, in the case of exit from the region, said signal will be lowered (it is also possible to choose the logic of the output).

The prohibited regions are volumes where the presence of the robot must without fail be inhibited. The definition of a volume of this type in the working area of the robot entails continuous control of the position of the robot in such a way as to prevent the area from being reached; this control is made whatever the state of the robot (programming of the robot or automatic operation of the robot). This procedure prevents contact with the declared interference region/regions by automatically regulating the speed of the robot on the basis of its distance from the region itself. No output signal will be sent to the PLC but in the case of where the IR is reached, the system will generate an error and stop the robot.

Finally, the hybrid regions are volumes that can change their status from monitored to prohibited and vice versa on the basis of the logic state of the input signal. Simultaneously, it is possible to define an output signal that functions as booking for entry into the region and another output signal for access into the hybrid region. In this way, it is possible to manage in a versatile and innovative way (as compared to the prior art) the interblocks as described in the previous paragraph. When the hybrid regions have been rendered prohibited by the input, they moreover present the characteristic of inducing in the robot a controlled deceleration as far as the limit of the region, where the speed of the robot reaches zero. Once the region is re-enabled by the input, so that it is rendered monitored, the system automatically restores the movement of the robot, without blocking the pending movement; given that the region is monitored, at this point the system will communicate on the outside via the output the presence or otherwise of the robot within the area of booking or within the interference region.

Thanks to the aforesaid arrangements, the invention enables an advanced programming of the interblocks.

Figure 1:
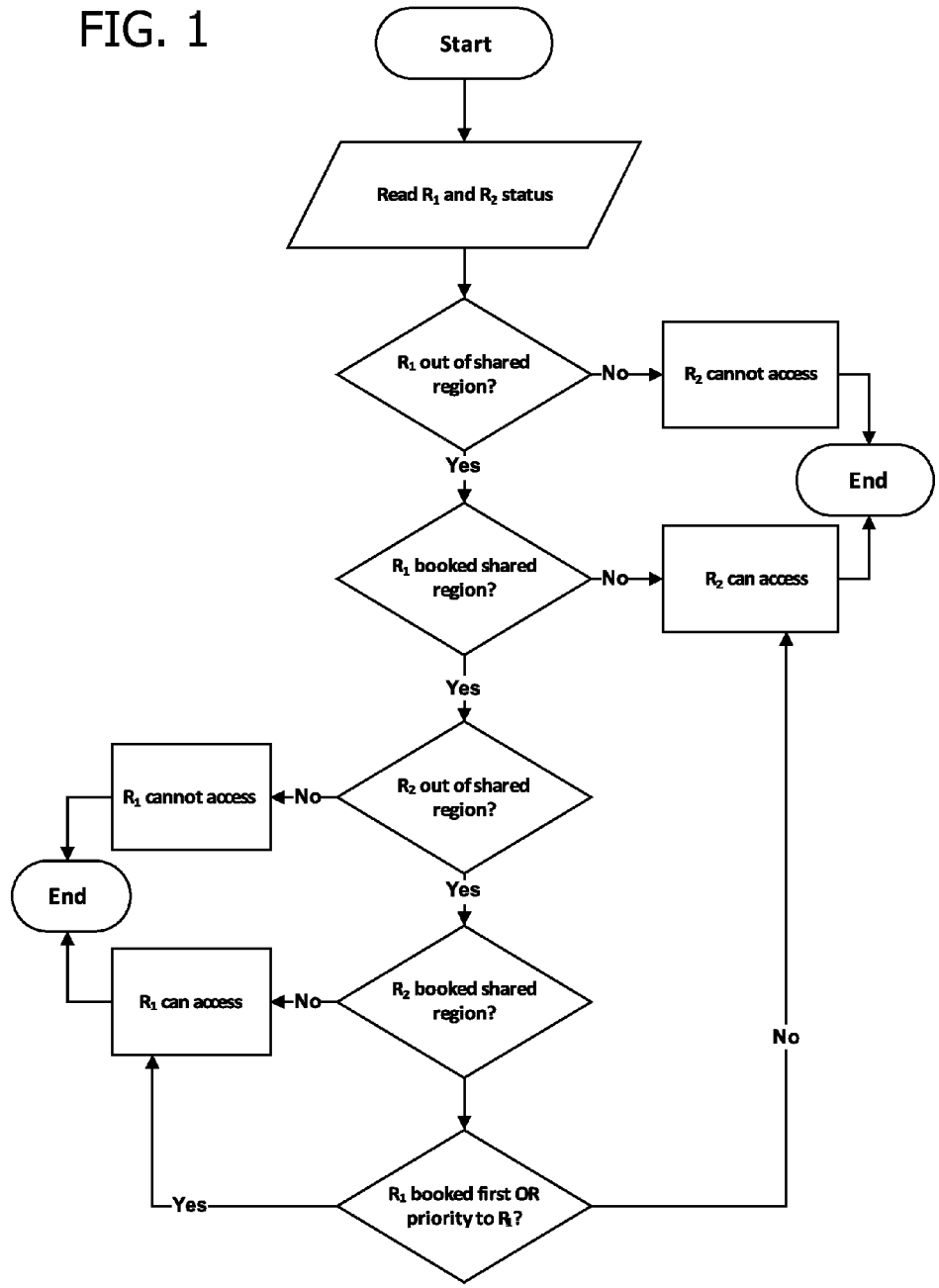
FIG. 1 illustrates the block diagram already described above, corresponding to the methods according to the known art.

The possibility of defining hybrid regions that can vary their status passing from monitored to prohibited enables an advanced management of the "classic" interblocks used in real robotized cells. The basic aspect of the invention lies essentially in the possibility of defining regions, with different shapes/geometries, that can be dynamically activated/de-activated by an input and that automatically manage setting of two types of outputs: an output of booking for entry into the shared region and an output of presence within the shared region itself. With these three signals it is possible to keep management of the policy of access of the PLC represented in FIG. 1 unvaried (affording a non-indifferent advantage as regards the aspects of compatibility with current systems), drastically simplifying, however, management of the interblocks within the robot programs. In fact, after definition of the hybrid interference regions (which hence represent the working space shared between two or more robots), it is sufficient to associate the correct inputs and outputs to the interference regions declared in the program in such a way that they can be handled by the PLC. Reproduced below is an example of programming of a spherical hybrid interference region:

```
IR_SET(IR_RESERVATION,$FMO[1],1,1,ON)
IR_SET(IR_PRESENCE,$FMO[1],2,1,OFF)
IR_SET(IR_CONSENT,$FMI[1],1,1,ON)
IR_CreateSphere(pnt0007P, 200, 1, 1)
IR_SWITCH(ON,1)
MOVEFLY JOINT TO pnt0650x ADVANCE
MOVEFLY JOINT TO pnt0150x ADVANCE
MOVEFLY JOINT TO pnt0653x ADVANCE
MOVE JOINT TO wp4661,
  WITH CONDITION[spot(1, 4661, 1, FALSE)],
ENDMOVE
MOVEFLY JOINT TO pnt0444x ADVANCE
MOVEFLY JOINT TO pnt0443x ADVANCE
MOVEFLY JOINT TO pnt0442x ADVANCE
MOVE JOINT TO xtn0008X
```

The first three instructions indicated above serve to declare that the interference region is of a hybrid type and to define on which outputs and inputs the ports for booking, presence, and request for access are to be mapped. The instruction IR_CreateSphere( . . . ) has the purpose of defining in the working space of the robot a spherical hybrid interference region associated to which are the outputs and inputs declared previously. It should be noted that the declaration of the region is performed a only once at start of the program and will render totally automatic management of the interblocks, irrespective of the flow of the program itself, in which there will no longer be present explicit instructions on sending of and waiting for signals (unlike the solution according to the known art).

In any operating condition (whether in the step of programming of the robot or in the step of automatic operation of the robot), the system will verify automatically the status of the hybrid interference regions, set by the incoming input. In this way, if the access to an interference region is inhibited to a robot (by setting, for example, the input to 0), this will not be able to enter the region autonomously, in the case where, for example, any movement programming is being executed on the robot, and likewise entry will be inhibited to the robot also when a human operator programming the robot attempts to bring the robot within the inhibited region. The behaviour of the robot in either case is to carry out a controlled deceleration to bring it to a zero speed as it approaches the prohibited interference region, with a reduction of the general override proportional to the distance from the closest point between the Tool Center Point of the robot and the interference region.

The innovation introduced with the hybrid interference regions mainly regards the possibility of restoring automatically the movement of the robot given a change in the input for control of the status of the hybrid IR. In other words the robot is able to resume autonomously the movement (with a smooth increase in the override) that preceded arrest in the proximity of the inhibited IR, in the case where the input signal were to pass from 0 (condition of inhibition to entry) to 1 (condition of access enabled).

As is evident from the foregoing description, the method according to the invention is basically characterized in that it controls the robots in parallel, instead of adopting the sequential operating mode according to the known art. In particular, the method according to the invention, in addition to envisaging control of the working space of each robot by means of an output signal from the robot, also envisages the possibility of managing activation/de-activation of inhibition to entry into the hybrid region with an input to the robot from the PLC and moreover envisages the possibility of defining a further output signal to the PLC for booking entry into the hybrid region. The method moreover manages automatic stopping and resumption of the movement of the robot, regulating the speed of arrest and resumption thereof in such a way as to prevent sharp stops in the proximity of the limit of the inhibited interference region and to restore movement of the robot as fast possible.

Of course, without prejudice to the principle of the invention, the details of construction and the embodiments may vary widely with respect to what is described and illustrated herein purely by way of example, without thereby departing from the scope of the present invention.

What is claimed is:

1. A method for controlling at least two robots having respective working spaces including at least common working region, with a central electronic unit for controlling the robots, for communicating with the robots and for governing movements of the robots, preventing any interference between them in the common working region, the method comprising:

modelling a working space of each robot, taking into account objects present in the working space of the robot, by defining one or more interference regions each constituted by an elementary geometrical figure;

classifying the interference regions in three different categories:

prohibited interference regions, defined as regions of space where a presence of the robot must without fail always be inhibited due to a permanent presence of one or more objects with which the robot must not interfere;

monitored interference regions, defined as regions of space where the presence of the robot is accepted, but controlled, the robot being pre-arranged for sending a signal to the central control unit whenever it enters a monitored interference region and whenever it exits from the monitored interference region; and hybrid interference regions, defined as regions of space that are able to change between a status of monitored interference region and a status of prohibited interference region, as a function of an input signal to the robot sent by the central control unit;

pre-arranging each robot for sending to the central control unit a first output signal, serving as entry booking, whenever the robot is about to enter a hybrid interference region, and a second output signal, serving as an entry/presence warning, whenever the robot enters a hybrid interference region; and varying dynamically a status of each hybrid interference region for each robot, during operation of the robot, by sending, from the central control unit, an input signal to the robot, which renders the hybrid interference region monitored or prohibited for the robot, according to whether the hybrid interference region is free from other robots.

2. The method according to claim 1, wherein, when the hybrid interference region is switched for a given robot into a status of a prohibited interference region by sending to the robot the input signal from the central control unit, provided that the robot is moving towards the prohibited interference region, the method further comprises:

decelerating the robot in a controlled way up to a limit of the hybrid interference region, where a speed of the robot reaches zero.

3. The method according to claim 2, wherein, when the prohibited interference region is re-enabled by means of a new input signal to the robot that sends the prohibited interference region into the status of monitored interference region for the robot, the method further comprises:

automatically restoring the movement of the robot, without blocking pending movement of the robot in the case where the robot is still in progress.

* * * * *